(12) United States Patent
Yamamoto et al.

(10) Patent No.: US 7,857,107 B2
(45) Date of Patent: Dec. 28, 2010

(54) GROUND TOWING POWER ARCHITECTURE FOR AN ELECTRIC BRAKE SYSTEM OF AN AIRCRAFT

(75) Inventors: David Yamamoto, Mill Creek, WA (US); Erik Godo, Redmond, WA (US); Joel T. Purificacion, Shoreline, WA (US); Marcelino Montano, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 1071 days.

(21) Appl. No.: 11/555,630

(22) Filed: Nov. 1, 2006

(65) Prior Publication Data

US 2008/0099603 A1     May 1, 2008

(51) Int. Cl.
*B60T 13/64*     (2006.01)
(52) U.S. Cl. .......................................... 188/3 H; 303/15
(58) Field of Classification Search ...................... 303/3, 303/15, 20, 126; 244/110 A; 307/9.1; 188/3 R, 188/3 H
See application file for complete search history.

(56) References Cited

U.S. PATENT DOCUMENTS

| | | | |
|---|---|---|---|
| 4,007,890 A * | 2/1977 | Bremer et al. ................. 244/50 |
| 4,113,041 A * | 9/1978 | Birkeholm ................. 180/14.1 |
| 6,095,293 A | 8/2000 | Brundrett et al. |
| 6,702,069 B2 | 3/2004 | Ralea et al. |
| 2003/0010583 A1* | 1/2003 | Arnold et al. ........... 188/106 R |
| 2008/0073970 A1* | 3/2008 | Griffith ....................... 303/152 |
| 2008/0157590 A1* | 7/2008 | Godo ......................... 307/9.1 |

OTHER PUBLICATIONS

PCT US2007/023074, International Search Report, Nov. 6, 2008.

* cited by examiner

*Primary Examiner*—Christopher P Schwartz
(74) *Attorney, Agent, or Firm*—Tung & Associates

(57) ABSTRACT

A power management architecture as disclosed herein is suitable for use in connection with an electric brake system of an aircraft. During ground towing operations when the aircraft engines are off, the power management architecture provides operating power to the electric brake system (and other aircraft systems that are required to support towing operations) via the main aircraft battery. This towing power mode prevents the battery from powering other aircraft systems during towing operations, thus reducing the load on the battery.

20 Claims, 3 Drawing Sheets

GROUND TOWING POWER ARCHITECTURE FOR AN ELECTRIC BRAKE SYSTEM OF AN AIRCRAFT

TECHNICAL FIELD

Embodiments of the present invention relate generally to an electric brake system for an aircraft. More particularly, embodiments of the present invention relate to a power management architecture for an electric brake system of an aircraft.

BACKGROUND

Under normal operating conditions, an electric brake system for an aircraft relies upon an active power source, e.g., a power supply that is driven by the aircraft engine or engines. Such an active power supply can provide sufficient energy to drive the electric brake actuators on the aircraft, which may require relatively high drive power. There are, however, certain situations where aircraft rely upon backup power supplies. For example, an aircraft may utilize a battery (when the aircraft engines are not running) during towing, maintenance, or parking brake adjustment operations.

An electric brake system, which is normally utilized during towing operations, can place high power demands on a backup power supply whether or not the brake mechanisms are being actuated. Consequently, an electric brake system can cause rapid discharging of the backup power supply if the electric brake system is not shut down promptly following towing operations. Moreover, many systems on an aircraft are not required during certain operations that rely upon a backup power supply (such as towing). If any nonessential aircraft systems remain active during such operations, the backup power supply can be unnecessarily taxed to the point where it may not be able to adequately support the needs of more important functions, such as the electric brake system.

BRIEF SUMMARY

The techniques and technologies described herein can be utilized by an aircraft to manage power delivered to the aircraft systems during operations that rely upon a backup power supply of the aircraft. In an embodiment of the invention, a towing power switching feature provides operating power to an electric brake system of the aircraft during towing operations, while keeping the other aircraft systems powered down to reduce the demands placed on the backup power supply.

The above and other aspects of the invention may be carried out in one embodiment by a power management method for an aircraft having a backup power supply and a number of aircraft systems. The aircraft systems include an electric brake system, and the method involves: receiving a towing power control signal; in response to the towing power control signal, providing power from the backup power supply to aircraft systems needed for towing operations, including the electric brake system; and preventing distribution of power from the backup power supply to aircraft systems that are not essential for towing operations.

The above and other aspects of the invention may be carried out in an embodiment by a power management system for an aircraft having an electric brake system. The power management system includes: a backup power supply configured to provide power to systems of the aircraft in the absence of active power; a power control unit coupled to the electric brake system and coupled to the backup power supply, the power control unit being configured to regulate the distribution of power from the backup power supply to the electric brake system; and a power switching arrangement coupled to the power control unit. The power switching arrangement is configured to: enable the power control unit to provide power from the backup power supply to aircraft systems needed for towing operations, including the electric brake system; and prevent distribution of power from the backup power supply to aircraft systems that are not essential for towing operations.

The above and other aspects of the invention may be carried out in an embodiment by a power control unit for an aircraft having a backup power supply and a number of aircraft systems. The aircraft systems include an electric brake system, and the power control unit includes: a control signal input configured to receive a towing power control signal; a power input configured for coupling to the backup power supply; and processing logic. The processing logic is suitably configured to respond to the towing power control signal, enable operation in a towing power mode, and provide power from the backup power supply to a limited number of aircraft systems, including the electric brake system.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with a variety of different aircraft brake systems and aircraft configurations, and that the system described herein is merely one example embodiment of the invention.

For the sake of brevity, conventional techniques and components related to signal processing, aircraft brake systems, brake system controls, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

Figure 1:
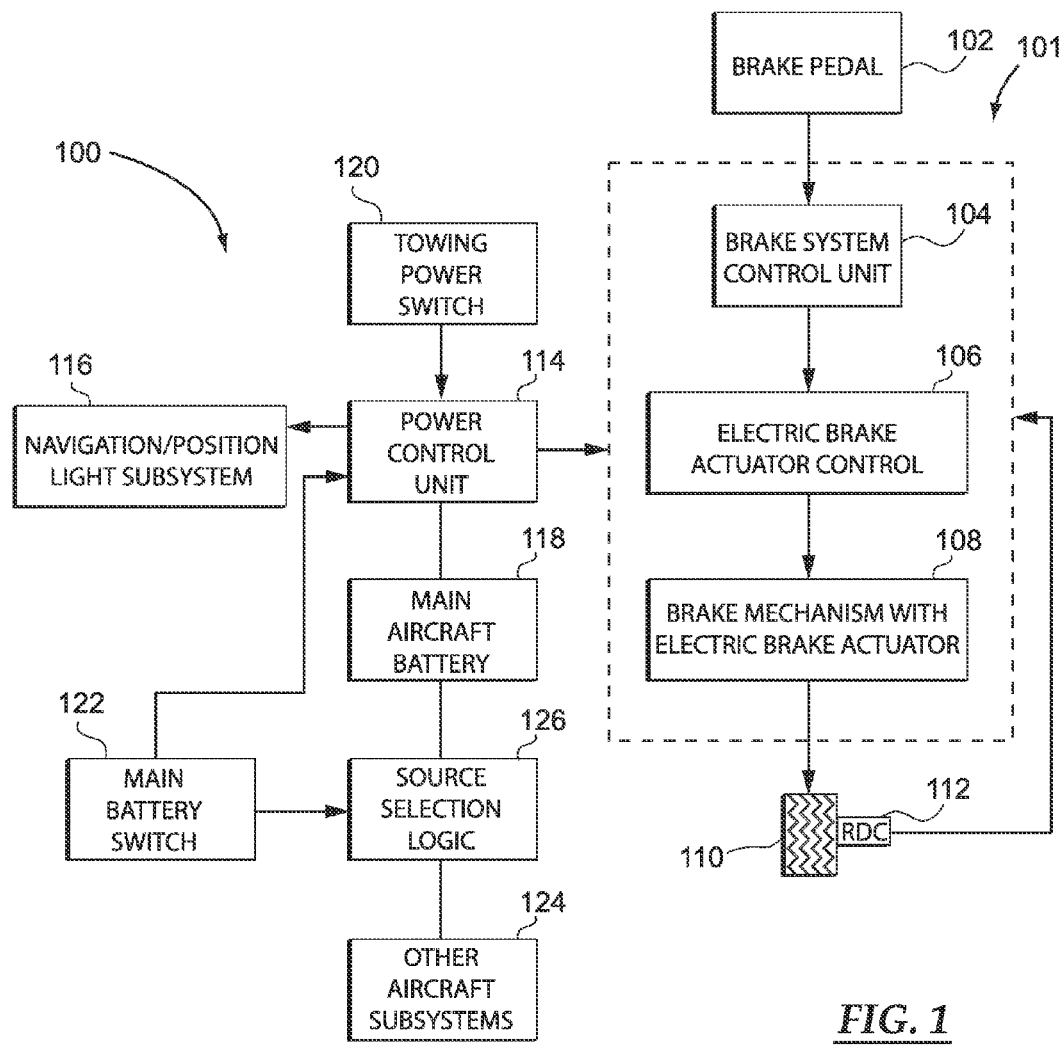
FIG. 1 is a schematic representation of a power management system for an electric brake system of an aircraft.
Figure 2:
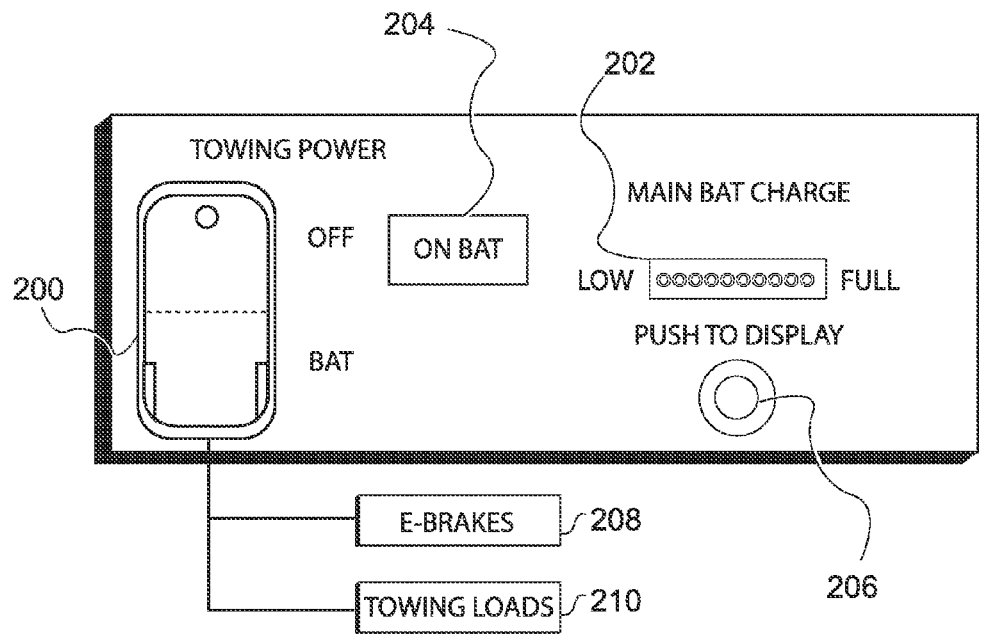
FIG. 2 is a front view of a portion of a flight deck panel that includes a towing power switch.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematics shown in FIG. 1 and FIG. 2 depict example arrangements of elements, additional intervening elements, devices, features, or components may be present in an embodiment of the invention.

An aircraft as described herein employs an electric brake system, which may be powered by a backup power supply during operations for which active aircraft power is unavailable. For example, the electric brake system may be driven by the main battery of the aircraft during towing operations. The aircraft employs a power management scheme that provides operating power to the electric brake system when active power and main battery power are turned off. This ground towing power mode reduces the load on the backup power supply by only providing power to the electric brake system and other aircraft systems that are necessary to support towing operations. The electric brake system is turned off after parking the aircraft to prevent unnecessary discharging of the backup power supply. In addition, the power management scheme provides a way for the electric brake system to be powered up for ground towing operations (and possibly other operations) without activating other aircraft systems.

In one embodiment, the power management architecture for the electric brake system is independent of the main aircraft battery switch. This ensures that nonessential systems that might otherwise drain the battery are not powered on during towing operations. In practice, a towing power switch can be installed in the flight deck of the aircraft to enable a pilot or crew member to control the towing power mode. The towing power switch provides a suitably formatted control signal to a power control unit of the electric brake system. In turn, the power control unit distributes power as needed to the electric brake system and possibly other systems (e.g., a navigation, position, or taxi lighting system) during the towing operation. The flight deck location of the towing power switch is preferred because a mechanic or crew member will be in the flight deck during towing operations in order to apply brakes if needed, for example to release the parking brake and to set the aircraft parking brake upon completion of the towing operation. At the conclusion of the towing operation, the towing power switch can be turned off to shut down the electric brake system (and possibly other systems).

The power management technique and architecture described herein permits movement of the aircraft without having to start the engines or an auxiliary power unit (APU). Ultimately, this reduces wear and tear of these systems, extends the life of the backup power supply, and results in reduced fuel consumption.

FIG. 1 is a schematic representation of a power management system 100 for an electric brake system 101 of an aircraft (not shown). FIG. 1 depicts a simplified portion of electric brake system 101 for the sake of clarity and brevity. Electric brake system 101 includes a brake pedal 102, a brake system control unit (BSCU) 104 coupled to brake pedal 102, an electric brake actuator control (EBAC) 106 coupled to BSCU 104, and a brake mechanism 108 coupled to EBAC 106. Brake mechanism 108 corresponds to at least one wheel 110 of the aircraft. Electric brake system 101 may also include an axle-mounted remote data concentrator (RDC) 112 coupled to wheel 110. In alternate embodiments, RDC 112 may be mounted elsewhere, e.g., it may be a truck-mounted RDC. Briefly, BSCU 104 reacts to manipulation of brake pedal 102 and generates control signals that are received by EBAC 106. In turn, EBAC 106 generates brake mechanism control signals that are received by brake mechanism 108. In turn, brake mechanism 108 actuates to slow the rotation of wheel 110. These features and components are described in more detail below.

Electric brake system 101 can be applied to any number of electric braking configurations for an aircraft, and electric brake system 101 is depicted in a simplified manner for ease of description. An embodiment of electric brake system 101 may include a left subsystem architecture and a right subsystem architecture, where the terms "left" and "right" refer to the port and starboard of the aircraft, respectively. In practice, the two subsystem architectures may be independently controlled in the manner described below. In this regard, an embodiment of electric brake system 101 as deployed may include a left brake pedal, a right brake pedal, a left BSCU, a right BSCU, any number of left EBACs coupled to and controlled by the left BSCU, any number of right EBACs coupled to and controlled by the right BSCU, a brake mechanism for each wheel (or for each group of wheels), and an RDC for each wheel (or for each group of wheels). In operation, the electric brake system can independently generate and apply brake actuator control signals for each wheel of the aircraft or concurrently for any group of wheels.

Brake pedal 102 is configured to provide pilot input to electric brake system 101. The pilot physically manipulates brake pedal 102, resulting in deflection or movement (i.e., some form of physical input) of brake pedal 102. This physical deflection is measured from its natural position by a hardware servo or an equivalent component, converted into a BSCU pilot command control signal by a transducer or an equivalent component, and sent to BSCU 104. The BSCU pilot command control signal may convey brake pedal sensor data that may include or indicate the deflection position for brake pedal 102, the deflection rate for brake pedal 102, a desired braking condition for brake mechanism 108, or the like.

An embodiment of electric brake system 101 may use any number of BSCUs 104. For ease of description, this example includes only one BSCU 104. BSCU 104 is an electronic control unit that has embedded software that digitally computes EBAC control signals that represent braking commands. The electrical/software implementation allows further optimization and customization of braking performance and feel if needed for the given aircraft deployment.

BSCU 104 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. A processor may be realized as a microprocessor, a controller, a microcontroller, or a state machine. A processor may also be implemented as a combination of computing devices, e.g., a combination of a digital signal processor and a microprocessor, a plurality of microprocessors, one or more microprocessors in conjunction with a digital signal processor core, or any other such configuration. In one embodiment, BSCU 104 is implemented with a computer processor (such as a PowerPC 555) that hosts software and provides external interfaces for the software.

BSCU 104 monitors various aircraft inputs to provide control functions such as, without limitation: pedal braking; parking braking; automated braking; and gear retract braking. In addition, BSCU 104 blends antiskid commands (which could be generated internally or externally from BSCU 104) to provide enhanced control of braking. BSCU 104 obtains pilot command control signals from brake pedal 102, along with wheel data (e.g., wheel speed, rotational direction, tire pressure, etc.) from RDC 112. BSCU 104 processes its input signals and generates one or more EBAC control signals that are received by EBAC 106. In practice, BSCU 104 transmits the EBAC control signals to EBAC 106 via a digital data bus. In a generalized architecture (not shown), each BSCU can generate independent output signals for use with any number of EBACs under its control.

BSCU 104 may be coupled to one or more associated EBACs 106. EBAC 106 may be implemented, performed, or realized in the manner described above for BSCU 104. In one embodiment, EBAC 106 is realized with a computer processor (such as a PowerPC 555) that hosts software, provides external interfaces for the software, and includes suitable processing logic that is configured to carry out the various EBAC operations described herein. EBAC 106 obtains EBAC control signals from BSCU 104, processes the EBAC control signals, and generates the brake mechanism control signals (brake actuator signals) for brake mechanism 108.

Notably, the functionality of BSCU 104 and EBAC 106 may be combined into a single processor-based feature or component. In this regard, BSCU 104, EBAC 106, or the combination thereof can be considered to be a brake control architecture for electric brake system 101. Such a brake control architecture includes suitably configured processing logic, functionality, and features that support the brake control operations described herein.

Wheel 110 may include an associated brake mechanism 108. EBAC 106 controls brake mechanism 108 to apply, release, modulate, and otherwise control the actuation of one or more components of brake mechanism 108. In this regard, EBAC 106 generates the brake mechanism control signals in response to the respective EBAC control signals generated by BSCU 104. The brake mechanism control signals are suitably formatted and arranged for compatibility with the particular brake mechanism 108 utilized by the aircraft. In practice, the brake mechanism control signals may be regulated to carry out anti-skid and other braking maneuvers. Those skilled in the art are familiar with aircraft brake mechanisms and the general manner in which they are controlled, and such known aspects will not be described in detail here.

Electric brake system 101 may include or communicate with one or more sensors for wheel 110. These sensors are suitably configured to measure wheel data (wheel speed, direction of wheel rotation, tire pressure, wheel/brake temperature, etc.) for wheel 110, where the wheel data can be utilized by electrical braking system 101. RDC 112 is generally configured to receive, measure, detect, or otherwise obtain data for processing and/or transmission to another component of electric brake system 101. Here, RDC 112 is coupled to (or is otherwise associated with) wheel 110, and RDC 112 is configured to collect and transmit its wheel data to BSCU 104. The digital data communication bus or buses on the aircraft may be configured to communicate the wheel data from RDC 112 to BSCU 104 using any suitable data communication protocol and any suitable data transmission scheme. In an alternate embodiment, RDC 112 may be configured to communicate the wheel data to EBAC 106. In yet another embodiment, RDC 112 may be configured to communicate the wheel data (or portions thereof) to both BSCU 104 and EBAC 106.

Electric brake system 101 may include or cooperate with a suitably configured power control unit or subsystem 114; power control unit 114 may be realized with one or more physical devices, components, or elements. Power control unit 114 may be coupled to BSCU 104, EBAC 106, brake mechanism 108, and/or to other components of electric brake system 101. Power control unit 114 may be configured to regulate, remove, or otherwise control power to one or more components of electric brake system 101 as needed to achieve a desired operating power mode. Power control unit 114 may also be configured to regulate, remove, or otherwise control power to one or more other systems or subsystems on the aircraft. In one preferred embodiment, however, power control unit 114 is dedicated to the braking system, and serves as an electric brake power control unit. For this example, power control unit 114 is coupled to a navigation/position light subsystem 116, and power control unit 114 provides operating power to navigation/position light subsystem 116 as needed. Power control unit 114 may utilize various switches, relays, and processing logic to facilitate the power management scheme described herein.

Power control unit 114 may also be configured to monitor the aircraft power systems and power buses that feed electric brake system 101. For example, power control unit 114 may be coupled to an active power supply (not shown) for the aircraft and to a backup power supply (e.g., the main aircraft battery) 118 for the aircraft. The active power supply may include a generator coupled to an engine and a suitably configured AC-to-DC converter, such as a transformer rectifier unit (TRU). In this embodiment, the active power supply provides power generated from the aircraft engine(s), while backup power supply 118 is capable of providing power to the aircraft systems when the engine(s) are not running. Power control unit 114 may be suitably configured to provide operating power to electric brake system 101 from the active power supply and/or from backup power supply 118 using the power management techniques described herein.

For this embodiment, power management system 100 includes, without limitation, backup power supply 118 (which is the main aircraft battery in this case), power control unit 114, and a power switching arrangement (which includes a towing power switch 120 and a main battery switch 122 in this case). When deployed on the aircraft, power management system 100 can control and regulate the distribution of power from (and/or access to) backup power supply 118 and/or the active power supply of the aircraft. As described above, power management system 100 is utilized in connection with electric brake system 101. In addition, power management system 100 may be utilized in connection with other aircraft systems or subsystems that are required or desired during ground towing operations, such as navigation/position light subsystem 116. Other systems that might be used during towing operations include flight interphone and VHF communications equipment, cockpit lighting, anti-collision beacon lights, window heating for defog, and indicators for remaining battery life and towing system operational state. Power management system 100 may also be configured to provide operating power as needed to other aircraft systems or subsystems (identified by reference number 124), where such other aircraft subsystems 124 may not be essential for towing operations. Other aircraft subsystems 124 may include, for example, flight controls, hydraulics, the common core system, and the environmental control system. For this example, other aircraft subsystems 124 receive main battery power through suitably configured source selection logic 126. Source selection logic 126 reacts to the state of main battery switch 122 such that power is provided to other aircraft subsystems 124 from the appropriate source.

Backup power supply 118 is suitably configured to provide power to systems of the aircraft in the absence of active power. Depending upon the state of the power switching arrangement, backup power supply 118 may be utilized to operate electric brake system 101, navigation/position light subsystem 116, and/or other aircraft subsystems 124 as needed. Power control unit 114, which is coupled to electric brake system 101 and to backup power supply 118, is suitably configured to regulate the distribution of power from backup power supply 118 to electric brake system 101, navigation/position light subsystem 116, and possibly other aircraft systems that might be needed during ground towing operations. In practice, power control unit 114 may provide these systems and subsystems with switched access to backup power supply 118 as needed. A power control unit suitable for use in power management system 100 is described in more detail below in connection with FIG. 3.

The power switching arrangement is coupled to power control unit 114. For this embodiment, the power switching arrangement includes towing power switch 120 and main battery switch 122. The power switching arrangement is suitably configured to enable power control unit 114 to provide power from backup power supply 118 to aircraft systems needed for towing operations (such as electric brake system 101 and navigation/position light subsystem 116). In addition, the power switching arrangement is suitably configured to prevent the distribution of power from backup power supply 118 to aircraft systems that are not essential for towing operations. This feature reduces the amount of loading on backup power supply 118 and minimizes unnecessary discharging of backup power supply 118.

Main battery switch 122 may be realized as a physical component located in the flight deck (or any suitable location). In practice, main battery switch 122 may be implemented as any device having an ON state and an OFF state, where the ON state enables a backup power mode for the aircraft and the OFF state disables the backup power mode. While in the backup power mode, most if not all of the systems and subsystems on the aircraft are powered by backup power supply 118. Although not specifically shown in FIG. 1, electric brake system 101 and navigation/position light subsystem 116 can be powered by backup power supply 118 while the backup power mode is active. This backup power mode can be used in the absence of active power for the aircraft. As mentioned above, the backup power supply 118 can experience heavy loading in the backup power mode when electric brake system 101 is powered up.

Towing power switch 120 may be realized as a physical component located in the flight deck (or in any suitable location). In practice, towing power switch 120 may be implemented as any device having an ON state and an OFF state, where the ON state enables the towing power mode for the aircraft and the OFF state disables the towing power mode. In an embodiment of power management system 100, power control unit 114 is configured to respond to the ON state of towing power switch 120 in an appropriate manner such that power from backup power supply 118 can be used to operate the aircraft systems needed for towing. In contrast, power control unit 114 is configured to respond to the OFF state of towing power switch 120 in an appropriate manner such that backup power supply 118 no longer drives electric brake system 101. For example, in response to the OFF state of towing power switch 120, power control unit 114 may power down electric brake system 101, reduce or remove the supply voltage(s) from electric brake system 101, or the like.

The power switching arrangement in this example generates a towing power control signal for power control unit 114, where the towing power control signal causes power control unit 114 to respond in an appropriate manner. The towing power control signal may be generated in response to actuation of towing power switch 120, namely, in response to the ON state of towing power switch 120. In particular, power control unit 114 responds by providing power from backup power supply 118 to those aircraft systems needed for towing operations.

In practice, power management system 100 is configured such that the backup power mode and the towing power mode can be independently controlled using main battery switch 122 and towing power switch 120. When the towing power mode is enabled, and the backup power mode is disabled, the other aircraft subsystems 124 do not draw power from backup power supply 118. Moreover, if the aircraft is completely shut down, then towing power switch 120 can be engaged to activate the towing power mode. If, however, main battery switch 122 is on, then all pertinent systems will operate normally regardless of the state of towing power switch 120. When active aircraft power is available, the battery relay opens and towing power switch 120 and main battery switch 122 do not have any effect.

FIG. 2 is a front view of a portion of a flight deck panel that includes a towing power switch 200 suitable for use in connection with a power management system for an electric brake system. The instrumentation depicted in FIG. 2 may be utilized in connection with power management system 100. In this regard, towing power switch 200 can be manipulated to an OFF state or to an ON state. In FIG. 2, "BAT" identifies the ON state of towing power switch 200. The flight deck panel location of towing power switch 200 is desirable because a pilot or crew member will be in the flight deck during towing maneuvers. The instrumentation may include a display element 202 that indicates the amount of charge remaining in the backup power supply (e.g., the main battery), which, in this example, provides the operating power to the electric brake system while the towing power mode is enabled. The "ON BAT" element 204 is an indicator that informs the user of the towing system operational state, and the "PUSH TO DISPLAY" element 206 is a button that provides a means for the user to quickly determine the battery charge state prior to performing a towing operation.

FIG. 2 schematically depicts systems that might be supported in the towing power mode. For example, an electric brake function 208 represents the overall electric brake system, including the parking brake function, and towing loads 210 represents other systems that are powered and available to support towing operations.

Figure 3:
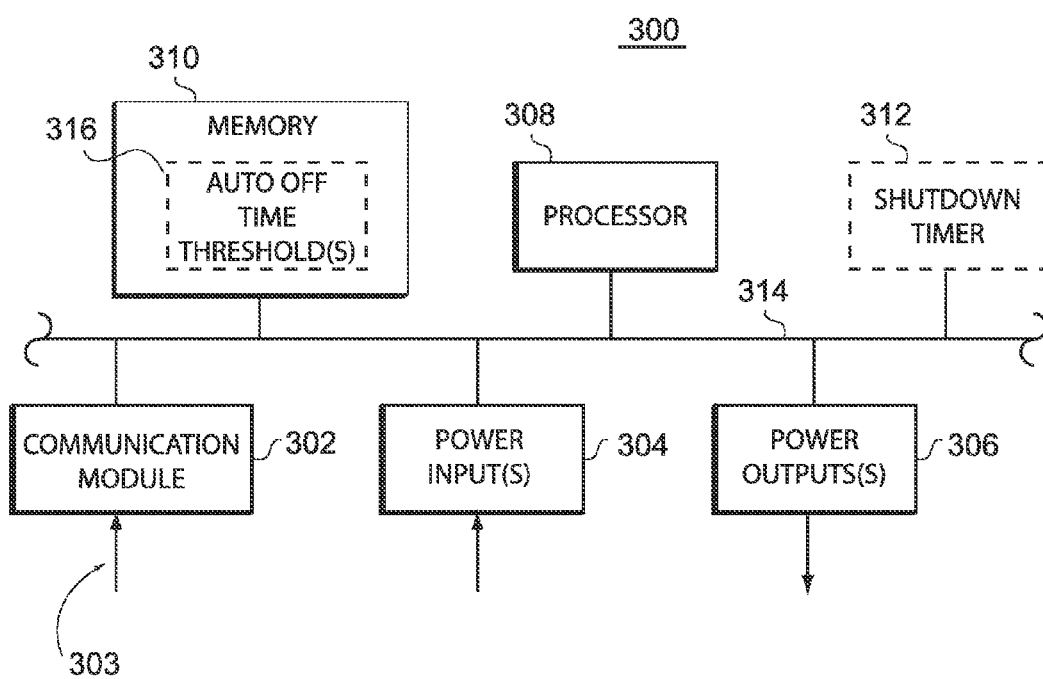
FIG. 3 is a schematic representation of a power control unit suitable for use with an electric brake system of an aircraft.

FIG. 3 is a schematic representation of a power control unit 300 suitable for use with an electric brake system of an aircraft. Power management system 100 and/or electric brake system 101 may employ an embodiment of power control unit 300. Power control unit 300 is preferably configured to function as described above for power control unit 114. Accordingly, some of the features, operating modes, and capabilities of power control unit 114 will not be redundantly described here in the context of power control unit 300. Power control unit 300 may include, without limitation: a communication module 302 having at least one control signal input 303; at least one power input 304; at least one power output 306; a processor 308 having suitably configured processing logic; and an appropriate amount of memory 310. Power control unit 300 may, but need not, include a shutdown timer 312. These elements may be coupled together using a data communication bus 314 or any suitably configured interconnection architecture or arrangement. Power control unit 300 need not be realized as a single or distinct physical component, and the various functional elements of power control unit 300 may be implemented with any number of physical devices.

Communication module 302 is suitably configured to receive, via control signal input 303, a towing power control signal that enables a towing power mode for the aircraft. In one embodiment of power control unit 300, control signal input 303 is configured for coupling to a towing power switch (described above) and communication module 302 receives a towing power control signal generated in response to the manipulation of the towing power switch into its ON state. In other words, the received towing power control signal indicates the ON state of the towing power switch. In practice, communication module 302 is coupled to processor 308 to allow processor 308 to respond to the towing power control signal in an appropriate manner.

Power input 304 is suitably configured for coupling to a backup power supply such as the main battery of the aircraft, and power output 306 is suitably configured for coupling to at least the electric brake system. Power input 304 can also be configured for coupling to an active power supply for the aircraft, and power output 306 can also be configured for coupling to any number of additional aircraft systems that might be needed to support towing operations (for example, the navigation/position light system, the taxi light system, etc.). Thus, power control unit 300 may serve as a switching power relay for the electric brake system and/or other aircraft systems.

Processor 308 may be implemented, performed, or realized in the manner described above for BSCU 104 (see FIG. 1). The processing logic corresponding to processor 308 is designed to carry out various operations and functions associated with the electric brake control scheme described herein. In particular, the processing logic of processor 308 is configured to enable operation in the towing power mode in response to the towing power control signal, such that power from the backup power supply is provided to a limited number of aircraft systems (including the electric brake system).

Furthermore, a method or algorithm (or portions thereof) described in connection with the embodiments disclosed herein may be embodied directly in hardware, in firmware, in a software module executed by processor 308, in analog circuitry, or in any practical combination thereof. A software module may reside in memory 310, which may be realized as one or more physical components having RAM memory, flash memory, ROM memory, EPROM memory, EEPROM memory, registers, a hard disk, a removable disk, a CD-ROM, or any other form of storage medium known in the art. In this regard, memory 310 can be coupled to processor 308 such that processor 308 can read information from, and write information to, memory 310. In the alternative, memory 310 may be integral to processor 308. As an example, processor 308 and memory 310 may reside in an ASIC.

Shutdown timer 312 is an optional item that can be implemented in an embodiment of power control unit 300. Alternatively, shutdown timer 312 can be implemented in a component of the electric brake system itself, such as a BSCU or an EBAC. Briefly, shutdown timer 312 monitors a time period that can be utilized by the power management system to determine whether the electric brake system can be shut down. Depending upon the particular embodiment, shutdown timer 312 may monitor one or more time periods, including, without limitation: the time elapsed since activation of the towing power mode; the time elapsed since a last braking command was processed by the electric brake system; the time during which the aircraft has remained stationary; the time from the start of parking brake adjusting; or the like. For this example, power control unit 300 is configured to automatically power down the electric brake system (and other systems that were powered up during the towing power mode) if shutdown timer 312 indicates a time period that is longer than a given threshold time period. The specific threshold time period can be pre-engineered in accordance with the chosen time period that is measured by shutdown timer 312. In this regard, memory 310 may be configured to store at least one auto off time threshold 316 for the aircraft. Auto off time threshold 316 is depicted in dashed lines in FIG. 3 because shutdown timer 312 itself is an optional feature of power control unit 300.

Figure 4:
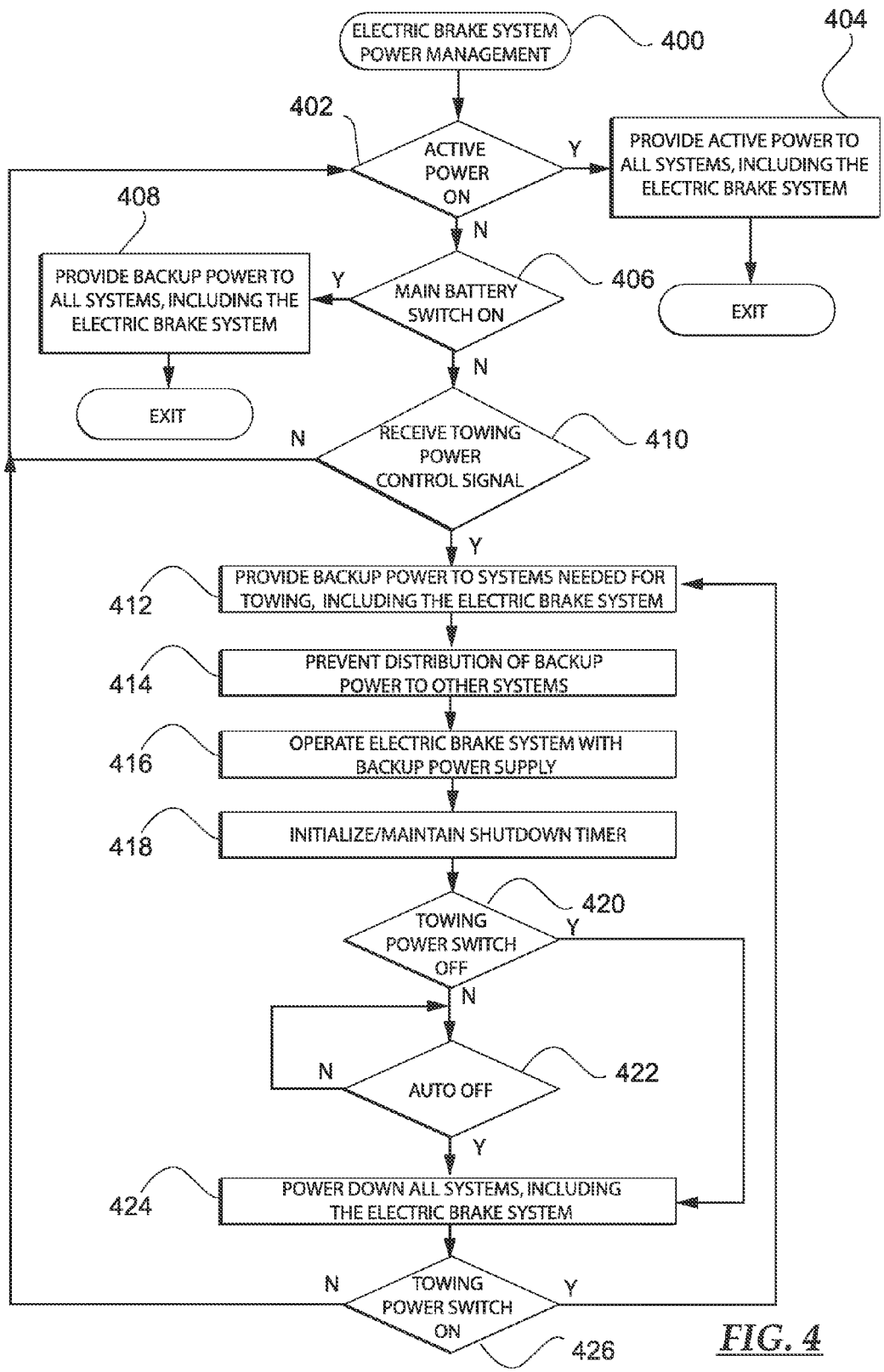
FIG. 4 is a flow chart that illustrates an electric brake system power management process.

FIG. 4 is a flow chart that illustrates an electric brake system power management process 400 suitable for use in connection with an embodiment of a power management system as described above. The various tasks performed in connection with process 400 may be performed by software, hardware, firmware, or any combination thereof. For illustrative purposes, the following description of process 400 may refer to elements mentioned above in connection with FIGS. 1-3. In embodiments of the invention, portions of process 400 may be performed by different elements of the described system, e.g., a power control unit, a power switching arrangement, a BSCU, or a backup power supply. It should be appreciated that process 400 may include any number of additional or alternative tasks, the tasks shown in FIG. 4 need not be performed in the illustrated order, and process 400 may be incorporated into a more comprehensive procedure or process having additional functionality not described in detail herein.

Power management process 400 responds to the current operating state of the aircraft. For example, if active power for the aircraft is on (query task 402), then process 400 responds by providing active power (from an active power supply) to all aircraft systems, including the electric brake system (task 404). This active power mode represents normal and traditional operation of the aircraft while its engines are running. If the main battery switch is on (query task 406), then process 400 responds by providing backup power (from the backup power supply) to standby loads, including the electric brake system and any other system that might be required during towing operations (task 408). As mentioned above, this backup power mode may result in excessive battery drain due to the relatively high power demands of the electric brake system.

If the power control unit receives a towing power control signal that indicates the selection of the towing power mode (query task 410), then power management process 400 responds by providing power from the backup power supply to the aircraft systems that are needed to support the towing operation (task 412); otherwise, process 400 may exit or it may be re-entered at query task 402. In connection with task 412, process 400 provides backup operating power to at least the electric brake system. In addition, process 400 may provide backup operating power to the navigation/position lighting system of the aircraft.

In the preferred embodiment, power management process 400 powers up only the electric brake system and those systems required for towing operations, thus reducing loading and corresponding drain of the main aircraft battery during the towing power mode. To accomplish this, process 400 may prevent distribution of power from the backup power supply to aircraft systems that are not essential for towing operations (task 414). In practice, the power control unit may switch out the backup power supply for the nonessential systems, initiate shutdown of the nonessential systems, and/or take any appropriate action to ensure that the backup power supply does not drive any of the nonessential systems.

In connection with the towing power mode, power management process 400 may proceed to operate the electric brake system with the backup power supply (task 416). In addition, process 400 can initialize and maintain a shutdown timer (task 418) that is configured to monitor an appropriate time period triggered by the power management system. As described above with respect to shutdown timer 312, the time period monitored by the shutdown timer may correspond to: the time since a last braking command was processed by the electric brake system; the time during which the aircraft has remained stationary; the time during which the towing power mode has been enabled; or the like. The shutdown timer may keep track of an elapsed time until it is reset or until the aircraft is shut down.

If the towing power switch is changed to its OFF state (query task 420), then power management process 400 can power down the electric brake system (task 424). Task 424 may also be associated with the powering down of other aircraft systems if appropriate to do so under the current operating conditions. While the towing power switch remains in its ON state, process 400 determines whether the current elapsed time period maintained by the shutdown timer is longer than a threshold time period (query task 422). If the shutdown timer indicates an auto off time period, then process 400 responds by powering down the electric brake system and any other systems that are essential to the towing operation (task 424). This feature ensures that the backup power supply is not unnecessarily taxed after the aircraft has been parked for an extended period of time.

In this example, power management process 400 includes a mechanism wherein the towing power mode can be enabled without having to activate the aircraft engines or the APU, and without having to first enter the backup power mode. Thus, if the towing power switch is subsequently switched to its ON state (query task 426), then process 400 can be re-entered at task 412 to again establish the towing power mode. Otherwise, process 400 may be re-entered at task 402 to check whether the active power mode or the backup power mode has been requested.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention, where the scope of the invention is defined by the claims, which includes known equivalents and foreseeable equivalents at the time of filing this patent application.

What is claimed is:

1. A power management method for an aircraft having a backup power supply and a number of aircraft systems, the aircraft systems including an electric brake system, the method comprising:
   receiving a towing power control signal thereby enabling a towing power mode for said aircraft;
   in response to the towing power control signal, providing power from the backup power supply to aircraft systems needed for towing operations, including the electric brake system; and
   preventing distribution of power from the backup power supply to aircraft systems other than the electric brake system that are not essential for towing operations associated with towing said aircraft.

2. A method according to claim 1, further comprising operating the electric brake system with the backup power supply.

3. A method according to claim 1, wherein providing power from the backup power supply comprises providing power to a navigation/position lighting system of the aircraft.

4. A method according to claim 1, further comprising generating the towing power control signal in response to an ON state of a towing power switch.

5. A method according to claim 4, further comprising powering down the electric brake system in response to an OFF state of the towing power switch.

6. A method according to claim 1, further comprising:
   maintaining a shutdown timer for the electric brake system; and
   automatically powering down the electric brake system if the shutdown timer indicates a time period longer than a threshold time period.

7. A method according to claim 6, wherein the time period corresponds to a time since a last braking command was processed by the electric brake system.

8. A method according to claim 6, wherein the time period corresponds to a time during which the aircraft has remained stationary.

9. A power management system for an aircraft having an electric brake system, the power management system comprising:
   a backup power supply configured to provide power to systems of the aircraft in the absence of active power;
   a power control unit coupled to the electric brake system and coupled to the backup power supply, the power control unit being configured to regulate the distribution of power from the backup power supply to the electric brake system; and
   a power switching arrangement coupled to the power control unit, the power switching arrangement being configured to:
   enable the power control unit to provide power from the backup power supply to aircraft systems needed for towing operations, including the electric brake system; and
   prevent distribution of power from the backup power supply to aircraft systems other than the electric brake system that are not essential for towing operations associated with towing said aircraft, said power switching arrangement enabled upon receiving a towing power control signal thereby enabling a towing power mode for said aircraft.

10. A system according to claim 9, wherein:
the power switching arrangement is configured to generate a towing power control signal for the power control unit; and
the power control unit is configured to respond to the towing power control signal to provide power from the backup power supply to aircraft systems needed for towing operations.

11. A system according to claim 9, wherein:
the power switching arrangement comprises a towing power switch; and
the power control unit is configured to respond to an ON state of the towing power switch to provide power from the backup power supply to aircraft systems needed for towing operations.

12. A system according to claim 9, wherein:
the power switching arrangement comprises a towing power switch; and
the power control unit is configured to power down the electric brake system in response to an OFF state of the towing power switch.

13. A system according to claim 9, further comprising a shutdown timer for the electric brake system, wherein the power control unit is configured to automatically power down the electric brake system if the shutdown timer indicates a time period longer than a threshold time period.

14. A system according to claim 13, wherein the time period corresponds to a time since a last braking command was processed by the electric brake system.

15. A system according to claim 13, wherein the time period corresponds to a time during which the aircraft has remained stationary.

16. A power control unit for an aircraft having a backup power supply and a number of aircraft systems, the aircraft systems including an electric brake system, the power control unit comprising:

a control signal input configured to receive a towing power control signal enabling a towing power mode for said aircraft;
a power input configured for coupling to the backup power supply; and
processing logic configured to enable operation in said towing power mode, in response to the towing power control signal, to provide power from the backup power supply to a limited number of aircraft systems essential for operations associated with towing said aircraft, including the electric brake system, and preventing distribution of power from the backup power supply to aircraft systems other than the electric brake system that are not essential for towing operations associated with towing said aircraft.

17. A power control unit according to claim 16, further comprising a power output configured for coupling to the electric brake system.

18. A power control unit according to claim 16, further comprising a power output configured for coupling to a navigation/position lighting system of the aircraft, wherein the processing logic is configured to provide power from the backup power supply to the navigation/position lighting system during operation in the towing power mode.

19. A power control unit according to claim 16, wherein:
the control signal input is configured for coupling to a towing power switch; and
the towing power control signal indicates an ON state of the towing power switch.

20. A power control unit according to claim 16, further comprising a shutdown timer, wherein the processing logic of the power control unit is configured to automatically power down the electric brake system if the shutdown timer indicates a time period longer than a threshold time period.

* * * * *